June 5, 1951        G. O. KIMBALL        2,556,092
LIQUID BUTTER APPLIER
Filed Dec. 2, 1949
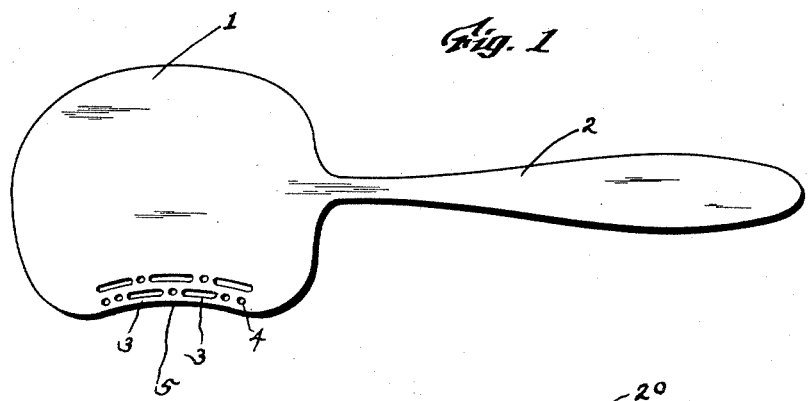
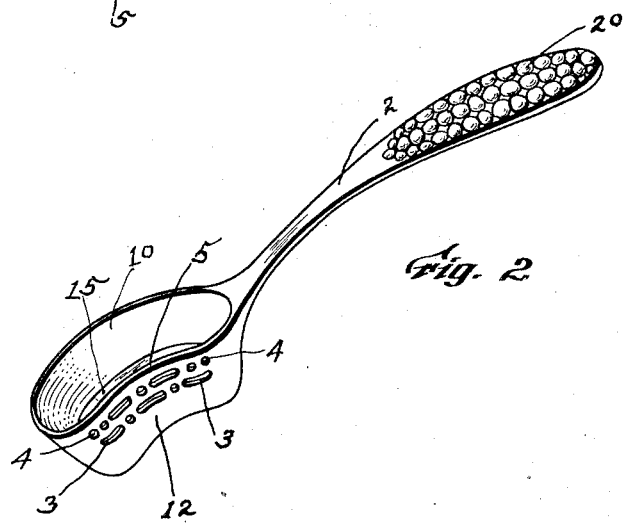
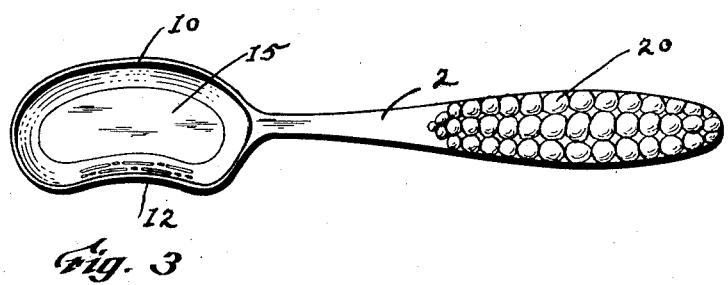
Garcia O. Kimball
Inventor
by James R. Hodder
Attorney

UNITED STATES PATENT OFFICE 2,556,092

LIQUID BUTTER APPLIER

Garcia O. Kimball, Belmont, Mass.

Application December 2, 1949, Serial No. 130,793

1 Claim. (Cl. 65—12)

My present invention is a novel and improved butter-applying device, wherein the butter is liquefied either by heat from the article with which it is to be used, or in liquefied or melted form when placed in the device.

My invention contemplates the provision of a handy, convenient, and attractive applier for butter, or the like, substantially in the form of a deep spoon containing a series of openings on the side so that the contents, when sufficiently heated, will be caused to flow thru these side openings by tilting the device while applying the same to the article to be coated with the liquefied butter.

A prime object of the invention is to devise a butter-holding spoon with a relatively deep bowl and with a series of slots or openings sufficiently above the bottom of the bowl of the spoon or applier so that the contents of the same may be retained in the spoon while dispensing small amounts thru the side openings.

Preferably, also, I form the side with the openings in a predetermined contour for any special purpose desired, such for example, as having this side of concave contour to contact roughly with an ear of corn. The corn itself, which is customarily served hot, will heat the side of the spoon with the openings therein and, thus, melt the contents if the same is in solid form when applied. Or the perforated side may be straight or convex for other special uses.

It is well known that applying butter to the round surface of an ear of corn is a difficult and wasteful proceeding when a knife or other like utensil is used; and it is an important object of my invention to conserve the butter thus supplied and applied and yet to give a full and sufficient flow of the thus-heated butter onto the surface of the corn.

Where melted or drawn butter is pre-heated and applied to the container, it will also flow freely thru the side openings and, thus, my device can be advantageously utilized to coat toast, meatcakes, lobster, bread, fish, pancakes, or a large variety of foods and all in an efficient and economical manner.

While primarily intended for a butter-applier, my device can be utilized in dispensing syrup, lard, shortening, grease, or the like and either by applying same by sliding it over the article to be treated, or, when melted or drawn butter is utilized the device can be employed to shake out the desired quantity on the food, griddle, skillet, or the like.

It is also an important object of my present invention to devise a construction wherein an economical method of manufacturing the applier is possible and feasible; and for this purpose I have so designed my applier as to be capable of being stamped out of flat sheet metal, silver, aluminum, or plastic and then molded into desired form.

Thus I contemplate forming my applier by two simple operations: First, stamping out the same as above noted, and simultaneously forming the openings in a predetermined side of the resultant spoon-like applier, and thereupon subjecting the same to a molding operation which would form the mild-like spoon, finish and ornament the handle, and result in positioning the openings sufficiently above the bottom of the molded cavity in the applier to retain a mass of the material to be applied, whether in solid or melted form for the purposes above briefly outlined.

Referring to the drawings illustrated a preferred form and method of manufacture;

Fig. 1 is a plan view showing the article as stamped from flat sheet material;

Fig. 2 is a view in perspective illustrating the completed article, and

Fig. 3 is a plan view of the complete applier.

As shown in the drawings, the sheet material is stamped out or otherwise formed with a sufficient area, as indicated at 1, to be subsequently molded into the applier form, and includes a handle 2, and a series of openings here shown as slots 3—3 and holes 4—4 through one side 5, which is to be shaped in concave form particularly intended for use of the applier on ears of corn. Such openings can be one or more slots or one or more holes, or other openings, or may be a series of the same to add a design feature, as shown for illustrative purposes.

Thereupon the molding operation completes the bowl-like formation, converting the rounded portion 1 into a convex flange or side 10, with the concave edge 5 into a side 12, forming the bottom of the bowl 15 and finishing the handle 2 in any manner desired. As herein illustrated, wherein the device is primarily intended for use in applying butter to ears of corn, I may form an ornamentation 20 on the handle to simulate kernels of corn or, of course, any other ornamentation to simulate other uses or any other generally attractive effect may be utilized.

The general usefulness of my applier will be readily appreciated and it will be noted that the applier may be filled with a quantity or pat of butter, or the like, and then rely on the contact of same with the heated articles of food to melt the contents of the applier, which will flow thru the openings and will be spread upon the article with which it is used, retaining the un-used butter in the rest of the bowl and, of course, maintaining the same in condition for subsequent applications.

As this is a prime object of the use of my device, I have coined the phrase "Buttercup" as a name therefor to designate my applier.

If desired, the butter or other article to be applied can be pre-heated and poured into the applier in melted condition and then dispersed thru the openings as desired. Thus, in using my "Buttercup" dispenser, the bowl is filled with unmelted material, or partially filled, and the material to be dispensed is pre-melted or liquefied, and thereupon the handle is partially tilted to incline the side with the openings sufficiently to cause the contents to flow through the openings and so as not to spill the contents over the rim of the bowl, while maintaining a reserve quantity in the bottom of the bowl below the level of the side openings.

Further, if desired, I may prefer to have the entire rim of the bowl 15, or any part thereof, formed of relatively thin construction to provide a suitable cutting edge with which to slice into and scoop up the butter content, so that, in effect, my novel butter spreader would be self-loading and the necessity of filling the bowl by more roundabout means thus eliminated.

I claim:

An improved liquid-applying device of the kind described, comprising a relatively deep bowl and a handle, said bowl being constructed and arranged to conduct heat therethrough to melt the contents therein, one side of said bowl being convex, the opposite side of the bowl being concave and having a series of openings therethru adjacent the rim of the bowl, the convex side of the bowl being unperforated, an edge portion of the rim being formed relatively thin as a cutting edge, and the bottom of the bowl being substantially below the lowest level of the openings in the concave side, whereby a portion of the contents may be dispensed thru said openings by tilting the bowl without overflowing the rim while retaining a reserve of the contents in the bottom portion.

GARCIA O. KIMBALL.

REFERENCES CITED

The following references are of record in the file of this patent:

UNITED STATES PATENTS

| Number | Name | Date |
|---|---|---|
| D. 32,149 | Burwell | Jan. 30, 1900 |
| D. 32,327 | Coghlan | Mar. 13, 1900 |
| D. 148,911 | Comeau | Mar. 9, 1948 |
| 133,564 | Clarke | Dec. 3, 1872 |
| 832,992 | Morgan | Oct. 9, 1906 |
| 1,057,269 | Prestien | Mar. 25, 1913 |
| 1,097,465 | Pratt | May 19, 1914 |
| 1,960,492 | Kahn | May 29, 1934 |
| 2,092,878 | Hess | Sept. 14, 1937 |
| 2,458,120 | Volpini | Jan. 4, 1949 |

FOREIGN PATENTS

| Number | Country | Date |
|---|---|---|
| 353,806 | Italy | Oct. 30, 1937 |